US008478932B2

(12) United States Patent
Baek et al.

(10) Patent No.: US 8,478,932 B2
(45) Date of Patent: Jul. 2, 2013

(54) POWER EFFICIENT MEMORY MANAGEMENT FOR EMBEDDED SYSTEMS

(75) Inventors: Seung Jun Baek, Seoul (KR); Ramanuja Vedantham, Dallas, TX (US); Se-Joong Lee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 688 days.

(21) Appl. No.: 12/559,504

(22) Filed: Sep. 15, 2009

(65) Prior Publication Data

US 2010/0070695 A1 Mar. 18, 2010

Related U.S. Application Data

(60) Provisional application No. 61/097,039, filed on Sep. 15, 2008.

(51) Int. Cl.
*G06F 12/00* (2006.01)
(52) U.S. Cl.
USPC .................. 711/104; 711/158; 711/E12.002
(58) Field of Classification Search
USPC ................................. 711/104, 158
See application file for complete search history.

(56) References Cited

U.S. PATENT DOCUMENTS

| | | | |
|---|---|---|---|
| 2001/0039607 A1* | 11/2001 | Goldstein et al. | 711/170 |
| 2006/0069898 A1* | 3/2006 | Patel et al. | 711/171 |
| 2007/0006000 A1 | 1/2007 | Jain et al. | |
| 2007/0233994 A1* | 10/2007 | Ye | 711/170 |
| 2007/0271419 A1* | 11/2007 | Yasukaga et al. | 711/147 |
| 2007/0297435 A1* | 12/2007 | Bucknell et al. | 370/412 |
| 2008/0098243 A1* | 4/2008 | Saewong et al. | 713/320 |
| 2008/0192742 A1* | 8/2008 | Kobayashi et al. | 370/389 |
| 2008/0195875 A1* | 8/2008 | Hobson | 713/320 |
| 2008/0244210 A1* | 10/2008 | Vingralek et al. | 711/170 |
| 2009/0287886 A1* | 11/2009 | Karstens | 711/147 |

* cited by examiner

*Primary Examiner* — Reginald Bragdon
*Assistant Examiner* — Aracelis Ruiz
(74) *Attorney, Agent, or Firm* — Steven A. Shaw; W. James Brady; Frederick J. Telecky, Jr.

(57) ABSTRACT

Embodiments of the invention provide a memory allocation module that adopts memory-pool based allocation and is aware of the physical configuration of the memory blocks in order to manage the memory allocation intelligently while exploiting statistical characters of packet traffic. The memory-pool based allocation makes it easy to find empty memory blocks. Packet traffic characteristics are used to maximize the number of empty memory blocks.

17 Claims, 6 Drawing Sheets

POWER EFFICIENT MEMORY MANAGEMENT FOR EMBEDDED SYSTEMS

CROSS-REFERENCE TO RELATED APPLICATIONS

The present application claims the benefit of the filing date of U.S. Provisional Patent Application No. 61/097,039, titled "Power-Efficient Memory Management for Embedded Systems" and filed Sep. 15, 2008, the disclosure of which is hereby incorporated by reference herein in its entirety.

TECHNICAL FIELD

Embodiments of the invention are directed, in general, to electronic devices and, more specifically, memory management for embedded systems.

BACKGROUND

The throughput requirement of user equipment (UE) supporting standards such as 3GPP, LTE, and WiMAX is increasing with improvements in air interface technology. For example, category 4 UEs in LTE require downlink (DL) throughput of 150 Mbps and uplink (UL) throughput of 50 Mbps. The datapath of the MAC subsystem in such equipment, such as the implementation of the MAC layer in the broadband modems in UE, performs complex tasks in order to provide reliable and lossless data delivery to upper protocol layers. The MAC subsystem must meet strict Quality of Service (QoS) requirements under all operating conditions, including poor radio channel quality, handover operations, etc.

In order to meet the data throughput levels and QoS, the need for data packet or Protocol Data Unit (PDU) storage at the UE increases since the PDUs need to be buffered for retransmission of lost PDUs. As a result of advances in silicon processes and the availability of high-density on-chip memory modules, architectural considerations lead to the use of on-chip SRAM having a total size on the order of several megabytes as data packet/PDU storage. Although off-chip solutions are available, such as the use of external SDRAM, such architecture suffers from high power consumption and additional I/O pin counts for the memory interface. Moreover, when it comes to a few megabytes, which is relatively small size for standalone memories, it is difficult to find a cost-effective solution for building such an external memory.

Using embedded SRAM for data packet/PDU storage is an optimal solution in terms of power and system cost. Simulation results show, for example, that the total required buffer size for DL and UL corresponds to 520 KB for LTE category 4 UEs. The use of on-chip SRAM as a packet buffer has the benefit of incurring minimal delay associated with packet processing. Thus, on-chip SRAM can contribute to predictable system performance and optimal power consumption, which allows for the scalability of the system.

SUMMARY OF THE INVENTION

Embodiments of the memory management system described herein reduce leakage power. Even though embedded SRAM architecture consumes less dynamic power compared to the external memory solution, the leakage power still remains same. Because the leakage power is proportional to the size of the memory, the portion of leakage power increases with the level of system integration.

It should be noted that the total size of the packet buffer is mandated by worst-case operating conditions. The packet buffer must be large enough to handle operations that require storage of large amounts of data packets/PDUs, such as, for example, when multiple services are in use or when the channel quality requires retransmission of data. The probability that the UE undergoes such worst-case traffic is quite small. Thus, the packet buffer is usually underutilized when the UE experiences "average" traffic levels. Accordingly, the memory management system can suppress substantial leakage power by turning off memory blocks that are not being used during an active session.

The two main issues addressed by the memory management system disclosed herein are: 1) identifying empty memory blocks efficiently, and 2) maximizing the empty memory blocks. From the perspective of embedded software, the packet buffer corresponds to a dynamic memory allocation region. Memory-pool based allocation is used for embedded applications. The present memory management system provides a framework for reducing the memory leakage power linked with memory-pool based dynamic allocation by exploiting the run-time characteristics of data traffic. The memory management system effectively re-uses the memory blocks to minimize the total number of memory blocks in use.

Embodiments of the invention provide a memory allocation module that adopts memory-pool based allocation and that is aware of the physical configuration of the memory blocks. This allows the system to manage the memory allocation intelligently while exploiting the known statistical characteristics of packet data traffic. Memory-pool based allocation simplifies the identification of empty memory blocks, and the packet traffic characteristics are used to maximize the number of empty memory blocks.

Embodiments of the memory management system improve the power savings for packet memory for any network protocol stack, including, for example, 3GPP, LTE, and WiMAX. The memory management system uses two general solutions to minimize the power requirement—a protocol-agnostic solution as well as a protocol-aware solution. Embodiments of the memory management system provide protocol-aware and protocol-unaware solutions to improve the power savings for packet memory. Prior memory management solutions do not incorporate protocol-specific operation to minimize the active memory and thereby minimize the power requirements for the packet memory.

BRIEF DESCRIPTION OF THE DRAWINGS

Figure 1:
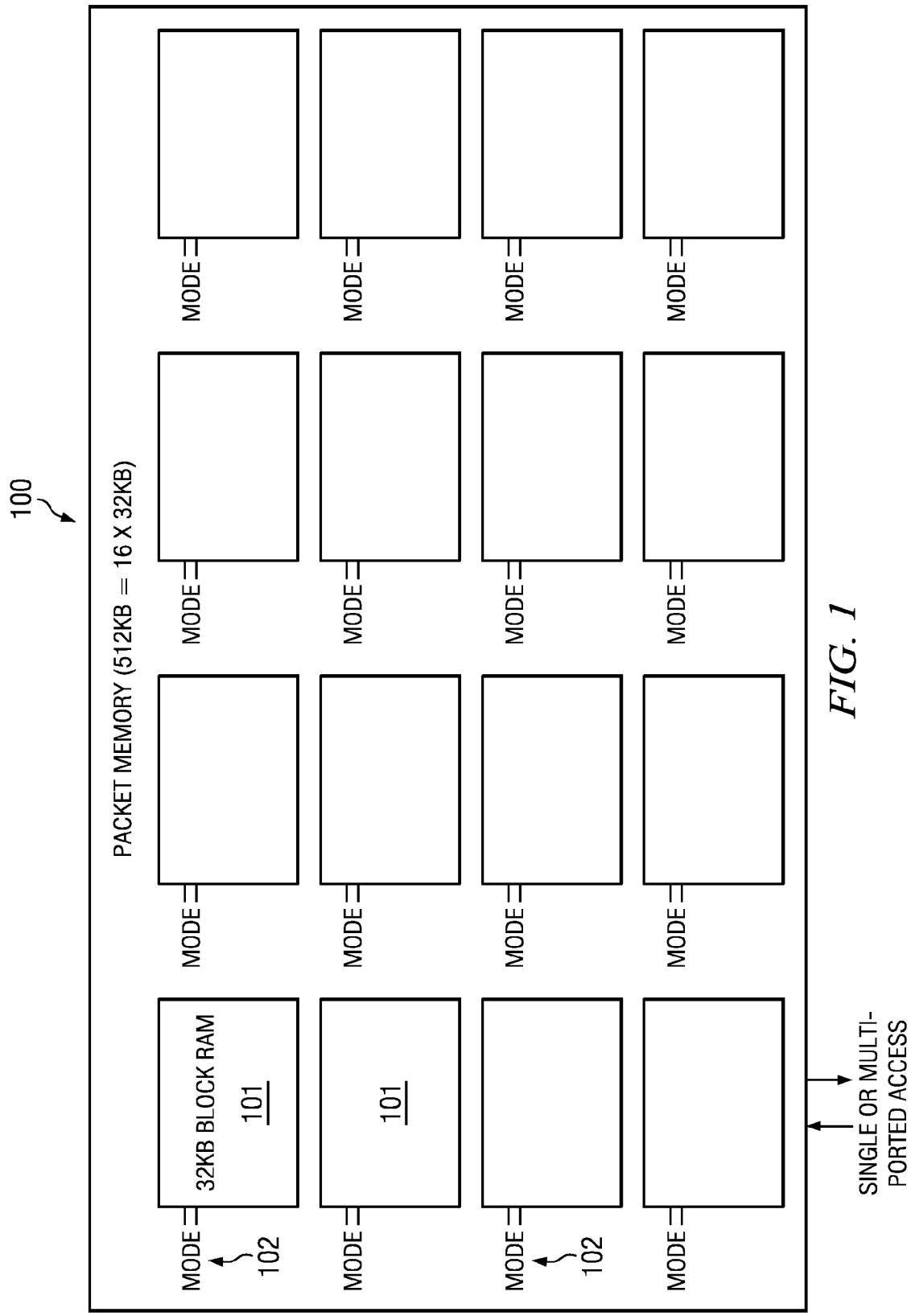
Figure 2:
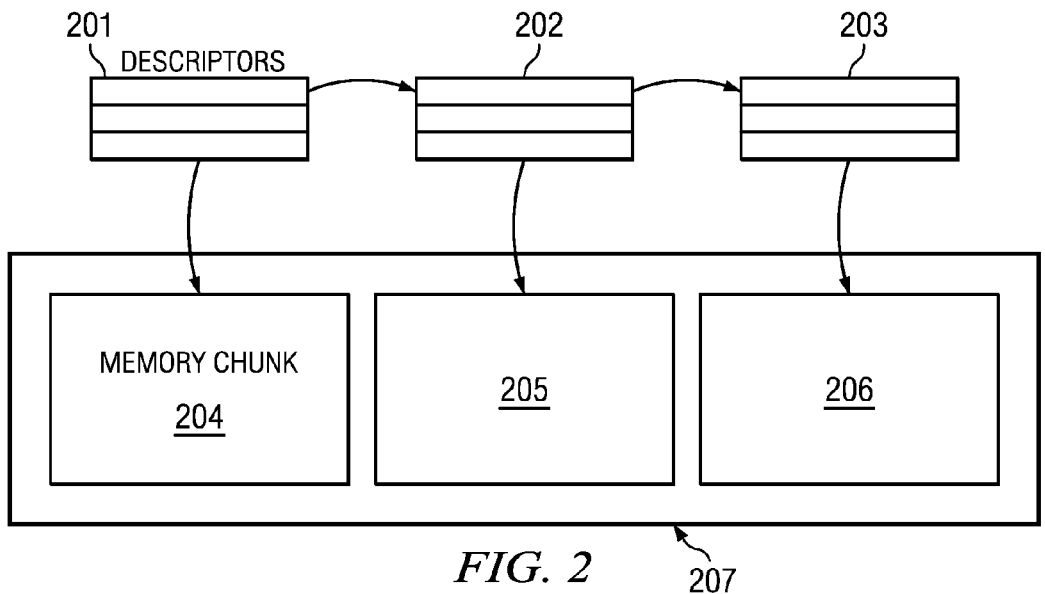
Figure 3:
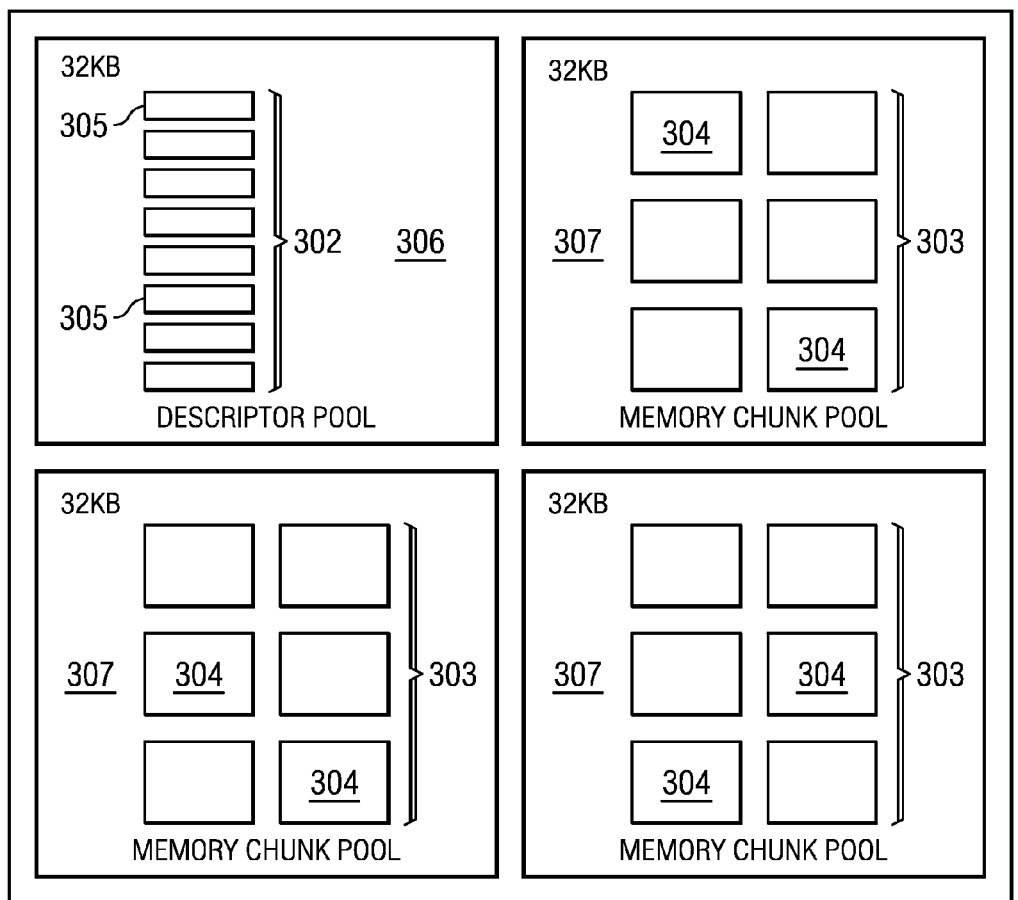
Figure 4:
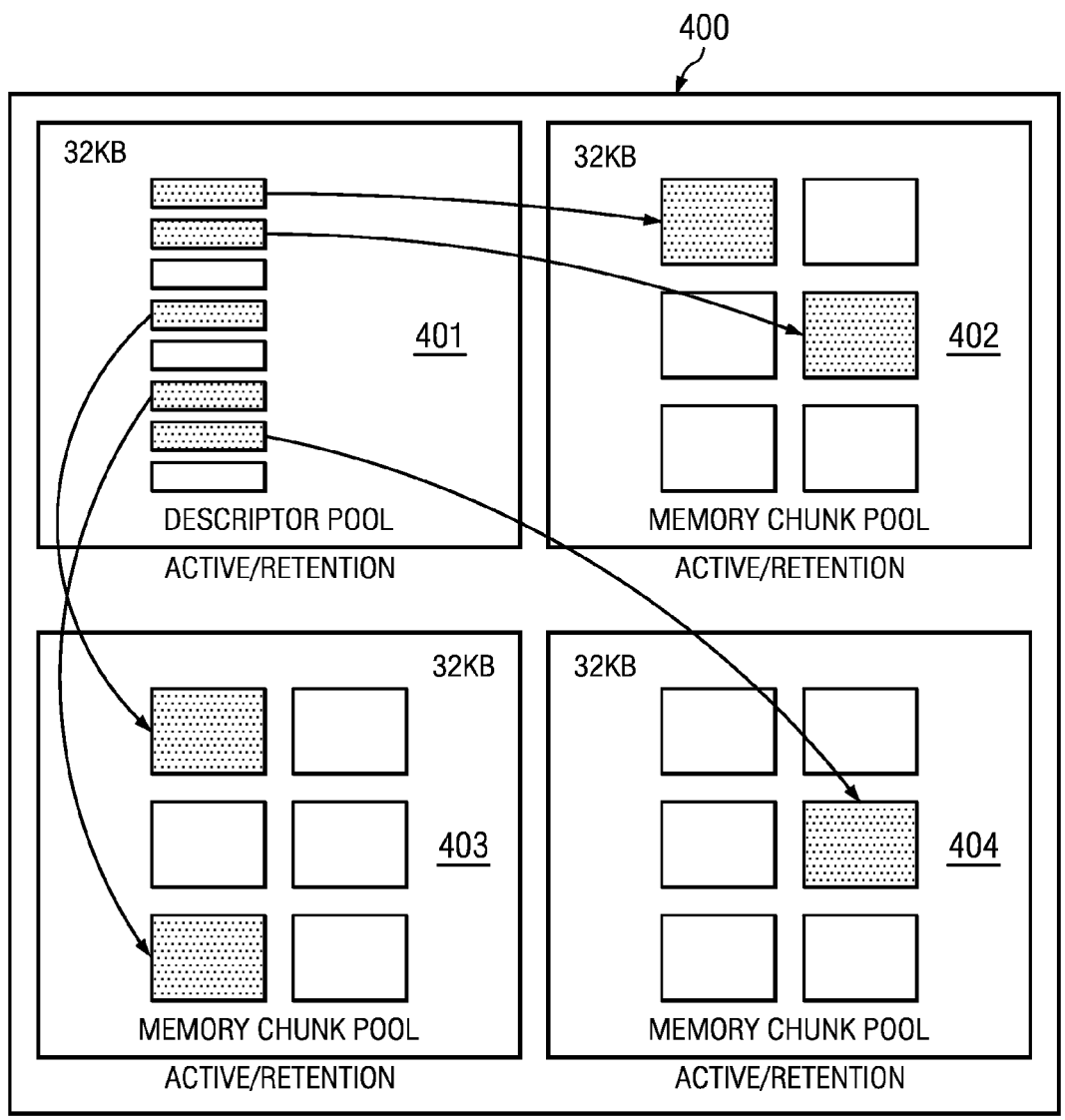
Figure 5:
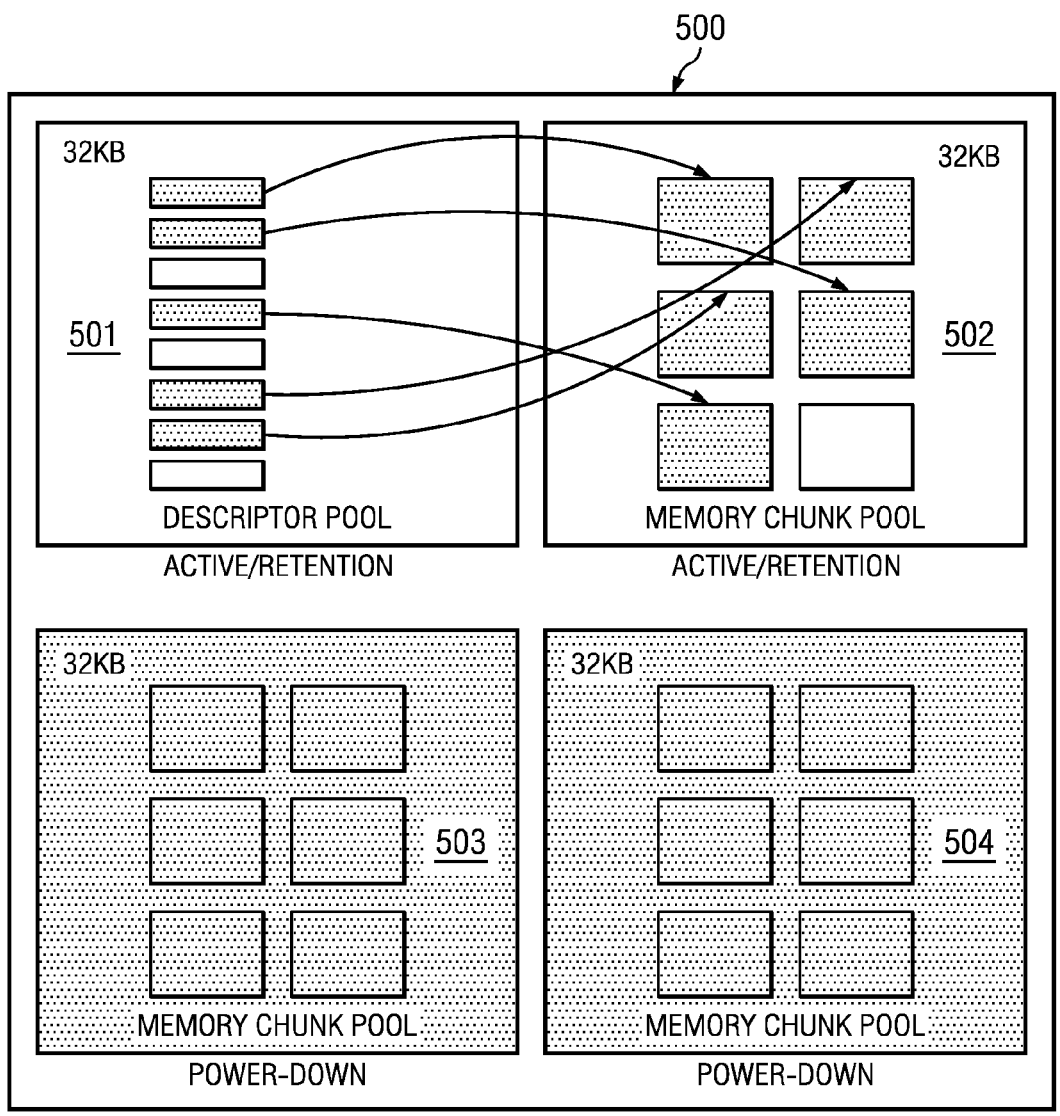
Figure 6:
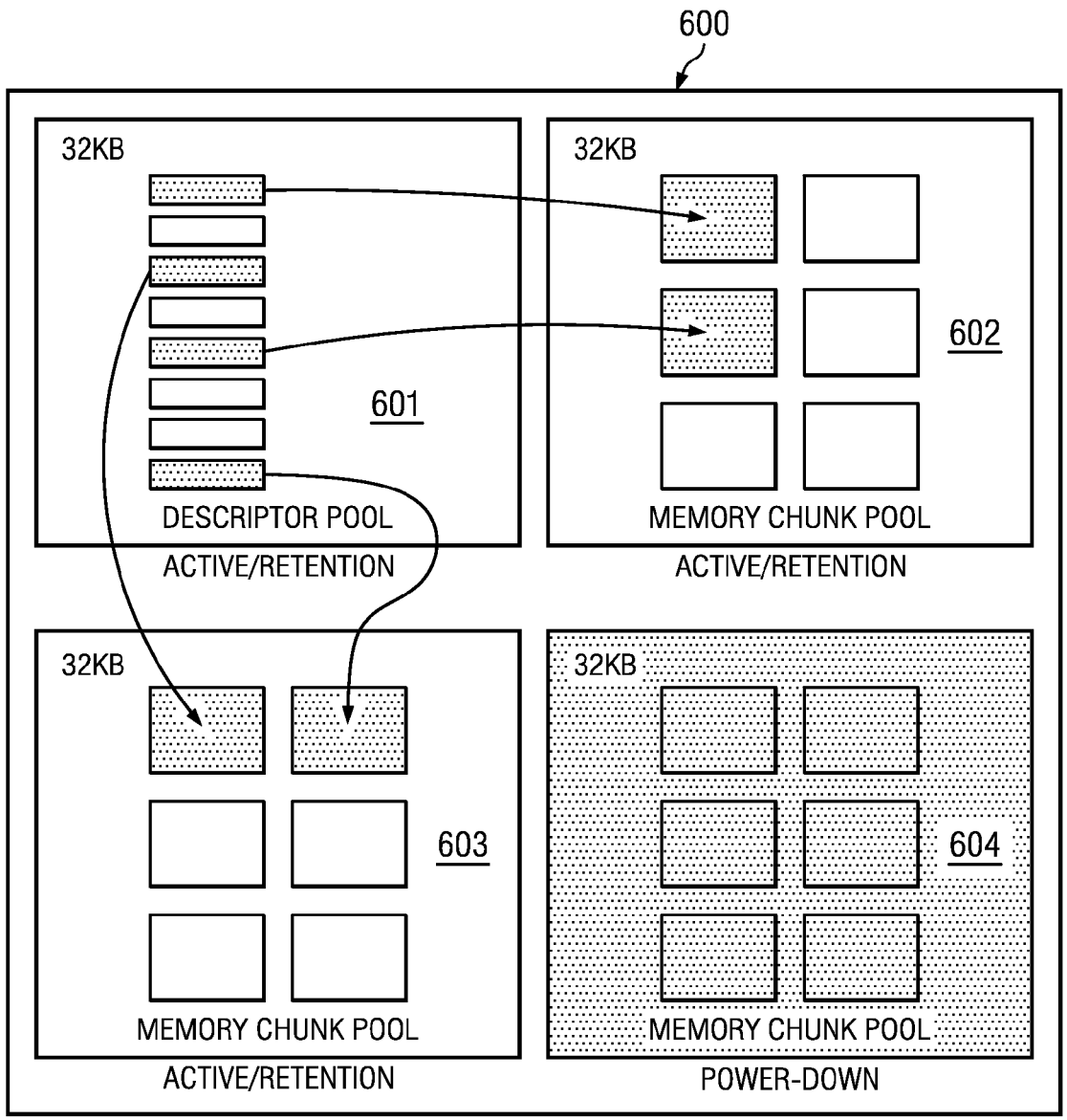
Figure 7:
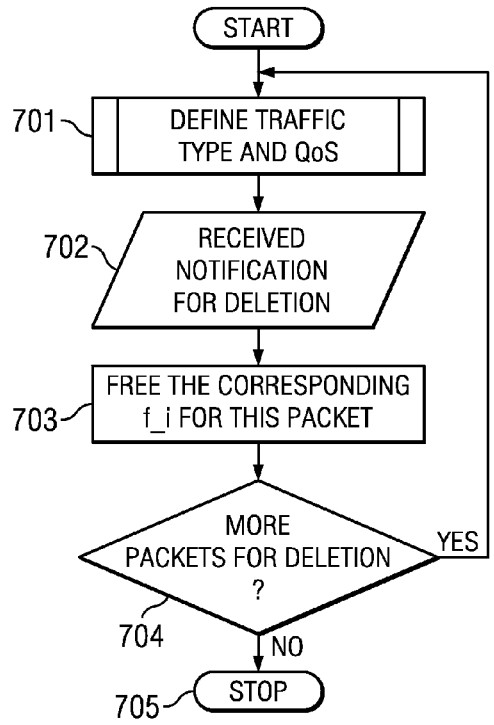
Figure 8:
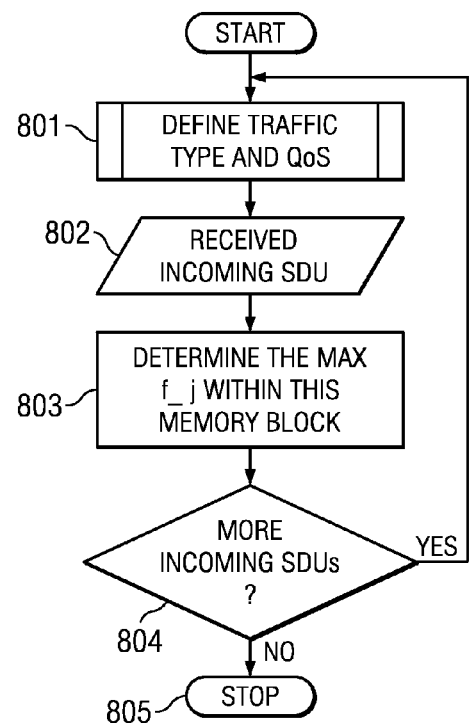

Having thus described the invention in general terms, reference will now be made to the accompanying drawings, which are not necessarily drawn to scale, and wherein:

FIG. 1 illustrates an exemplary 512 KB packet memory consisting of sixteen 32 KB block RAMs;

FIG. 2 illustrates the linked-list allocation of memory chunks;

FIG. 3 illustrates a memory layout for an exemplary embodiment of the memory management system;

FIG. 4 illustrates the distribution of allocated memory chunks in the memory;

FIG. 5 illustrates the distribution of allocated memory chunks in a power-aware allocation according to one embodiment of the memory management system;

FIG. 6 illustrates the distribution of memory chunks in a protocol-aware allocation according to an alternative embodiment of the memory management system;

FIG. 7 is a flowchart illustrating a process for deleting data packets according to one embodiment of the memory management system; and FIG. 8 is a flowchart illustrating a process for inserting data packets according to one embodiment of the memory management system.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Embodiments of the invention provide a memory allocation module that adopts memory-pool based allocation and is aware of the physical configuration of the memory blocks in order to manage the memory allocation intelligently while exploiting statistical characters of packet traffic. The memory-pool based allocation makes it easy to find empty memory blocks. The memory management system then uses the packet traffic characteristics to maximize the number of empty memory blocks.

The proposed memory allocation module controls the power states of the memory blocks such that it dynamically switches the power state of a memory block depending upon the physical utilization of allocated packet buffers at run-time. The module allocates memory in scatter-gather fashion, which is further efficient in both utilization of the memory blocks and power saving. The memory allocation module also provides a framework for determining the dimensions of the memory size breakdown, and provides multi-class power-aware memory allocation that takes the QoS of packet flow into account.

In one embodiment, the memory module is used to store network packets only. In such an embodiment, the memory module is referred to as packet memory. The packet memory can be physically divided into memory blocks similar to memory banking. Each memory block supports three power states of operation: active, retention and power-off. In active mode, normal read and write operations can be performed. The active mode consumes the highest leakage power, which is typically called active leakage power. In retention mode, the memory content is retained, but the memory cannot be accessed. The retention mode consumes low leakage power. In power-off mode, the memory content is lost. The power-off mode consumes least leakage power Referring now to FIG. 1, an exemplary packet memory pool 100 with a total size of 512 KB consisting of sixteen 32 KB block RAMs 101. Each RAM 101 receives control signals 102 to change the power state of the individual block 101. For example, Texas Instruments' GSxx compiler SRAMs provide such power management features including circuitry for controlling the power state of each individual memory block.

The system software, such an operating system of an LTE category 4 UE, allocates a memory region 101 to store packet data and frees the memory regions 101 when handling of the packet data is complete. Therefore, as the system runs, the software keeps allocating and freeing the memory regions 101 dynamically. As long as a memory block 101 contains at least a single word of data to be retained, the memory block 101 must be in either active mode or retention mode. If the whole region of a memory block 101 is cleared so that there is no data to be accessed by software or the memory block 101 is unused, then that memory block can be powered down (i.e. placed in power-off mode) to suppress leakage power. In embodiments of the present memory management system, the used portions 101 of memory 100 are "packed" during run-time so that as many unused memory blocks 101 can be placed in power-off mode. This may be efficiently accomplished using memory-pool based memory allocation.

It will be understood that the memory-management system described herein and memory pool 100 are not protocol dependent. Although 3GPP, LTE and WiMAX are referred to herein, this is simply for purposes of example. Memory pool 100 must be of sufficient size to support the worst-case operating conditions scenario for the relevant protocol. Memory pool 100 must be capable of handling the peak usage conditions, but such conditions are likely to occur infrequently and the memory pool 100 will be required to support a less-than-peak usage (i.e. an average load) in most applications. The present system provides a UE with the capability to turn off unused portions (101) of packet memory 100 in order to reduce leakage power.

For example, a system that is operating in an "acknowledge mode" may buffer transmitted data packets/PDUs in blocks 101 of packet memory 100 until the receiving unit acknowledges receipt of the packets. When the receiving unit acknowledges receipt of the packets, the saved packets in memory 100 may then be cleared and any unused memory blocks may then be put in power-off mode. For a system operating in an "in-sequence delivery" mode, the receiving unit may buffer received data in blocks 101 until earlier data packets in the sequence are received. In such a system, the memory blocks 101 may be cleared and placed in power-off mode once the data packet sequence is received and processed by the UE.

Those of skill in the art will recognize that memory pool 100 may be divided into as few or as many blocks 101 as practicable or necessary to provide memory management for a selected protocol. The key characteristic of memory pool 100 is that it must be divided into smaller physical instances, such as blocks 101, that can be turned on and off separately. Blocks 101 are logical regions of memory 100 and do not necessarily correspond to specific physical regions of memory 100.

Additionally, it will be understood that the size of memory blocks 101 may be of any size. The size of memory blocks 101 may be uniform or memory 100 may be divided into memory blocks of various sizes. If the UE is expected to support multiple services, then the size of the various memory blocks 101 may be selected based upon the anticipated packet size for the services supported. For example, a messaging or VoIP service may use relatively small data packets that can be stored in smaller memory blocks 101. On the other hand, a web browser may expect to use relatively large data packets or chunks of data that are more efficiently stored in larger memory blocks 101. The packet memory pool 100 may have a combination of small, medium, and large memory blocks 101 to support a variety of services. The size of all or some of the memory blocks may also be selected based upon the classes of service supported. Packets associated with different classes or different QoS may be assigned to different size blocks 101.

In embedded systems, the dynamic memory allocation should be simple and fast, thus the memory-pool based memory allocation is widely adopted. FIG. 2 illustrates a particular memory-pool based allocation scheme that is useful with the present memory-management system. The memory-pool based allocation consists of descriptors 201-

203 and memory chunks 204-206 in memory pool 207. It will be understood that any number of descriptors and memory chunks can be used. The available memory region is partitioned into small, fixed-size memory chunks 204-206, and such collection of chunks is called memory pool 207. Each descriptor 201-203 is associated with a specific memory chunk 204-206. When the size of requested or required memory space is greater than a single chunk, the descriptors may be linked together in a linked list to form a contiguous virtual memory allocation in a scatter-gather form. A field in descriptors 201-203 can be used to point to other descriptors to extend the memory region. For example, descriptor 201 is uniquely tied to memory chunk 204. If a memory region larger than memory chunk 204 is require, then descriptor 201 may be linked to descriptor 202, which is uniquely tied to memory chunk 205. These linked descriptors form a virtual memory chuck 204+205 with a larger size. If further memory space is need, then descriptor 202 may be linked to descriptor 203, which is uniquely tied to memory chunk 206, thereby forming virtual memory block 204+205+206. FIG. 2 shows the linked-list allocation of memory chunks. If memory chunks 204-206 are of size 256 KB, for example, and a 512 KB PDU is received, then linked descriptors can be used to extend the memory region to store the PDU. In such a configuration, descriptor 201 may be linked to descriptor 202 to create virtual block 204+205 to store the 512 KB PDU.

There are a "pool of descriptors" and a "pool of memory chunks," so that when memory allocation is requested (corresponding to the malloc( )call), the memory management module assigns descriptors and memory chunks from the pools of descriptors and memory chunks and links the descriptors, if necessary. When the memory needs to be freed (corresponding to the free( )call), the memory management module simply returns descriptors and chunks to the pool as available to be reassigned.

In prior systems, descriptors 201-203 may be stored at any location or block in the memory device. As long as a memory block is needed to store data, both its associated descriptor is also needed to identify the memory block. As a result, both the memory block holding the descriptor and the memory block holding the data must be in an active or retention mode. As a result, a situation may arise in which the only active data in a block is a descriptor pointing to another memory block. It is inefficient to have descriptors spread across multiple memory blocks since those memory blocks cannot be powered-off as long as the descriptors point to active memory locations. The memory spaced used to store a PDU includes the descriptor location as well as the memory chunk holding the actual data.

FIG. 3 shows a memory layout for an exemplary embodiment of the memory management system. The layout of the physical memory 301 illustrates the use of descriptor pool 302 and memory chunk pools 303. In one embodiment, the pools have separate physical locations 306 and 307, wherein the descriptor pool occupies one physical block of RAM 306. There may be any number of blocks of RAM, such as the sixteen 32 KB blocks illustrated in FIG. 1. Each memory chunk pool 303 is divided into chunks 304, which may be logical chunks within the physical memory blocks 306.

All of the individual descriptors 305 are gathered into pool 304 on designated descriptor pool memory block 306. This configuration allows for efficient descriptor use in which memory block 306 is always in active or retention mode to support descriptors assigned to active data. Because the other memory blocks 307 never store descriptors, those memory blocks never need to be maintained in an active or retention mode simply to support a descriptor.

If the memory allocation module is unaware of the physical memory partitioning in memory 301, then as time passes the allocated packets may be scattered randomly over multiple physical memory blocks 307 as illustrated in FIG. 4. The shaded areas of FIG. 4 represent allocated memory chunks. The physical memory blocks 401-404 having at least one allocated chunk must remain in retention or active mode. This results in an inefficient distribution of the stored data packets, which require all of the memory blocks 401-404 in memory 400 to be on.

FIG. 5 illustrates the distribution of allocated memory chunks in a power-aware allocation according to one embodiment of the memory management system. The memory allocation shown in FIG. 5 succeeds in packing the allocated memory chunks on one memory block 502. As a result, the same number of memory chunks are required in FIG. 4 are stored on memory 500 in FIG. 5, but using only one memory chunk pool. This configuration allows the unused memory blocks to be safely powered off. Accordingly, memory 500 stores the same amount of data as memory 400 (FIG. 4), but using only two powered memory blocks. This results in a power savings as the leakage power of memory blocks 503 and 504 is reduced. In memory 500, all of the chunks in memory block 502 are filled to the maximum extent practicable before storing data to another memory block.

The memory allocation shown in FIG. 5 may be used with a protocol-agnostic method in which the memory management system does not consider the service, class, or QoS associated with the PDUs when selecting chunks for storage. Instead, the protocol-agnostic memory management system ensures that a first block is maximized before storing PDUs to a second memory block.

The goal of the memory allocation system is to minimize the time-averaged number of occupied memory blocks, thereby optimizing the number of memory blocks that can be placed in power-off mode. In one embodiment, the memory allocation uses a best-fit on-line bin-packing approximation algorithm to assign data packets to memory chunks. The descriptor pool is separated into as many sections as the number of available memory blocks. The variable "n" is the number of memory blocks used for memory chunk pool. "DPi" is the descriptor pool for a memory block "i," where the sequence number "i" has the range of $1 <= i <= n$. The memory management system detects when Descriptor pool "DPi" is empty. If "DPi" is empty, it implies that the memory block corresponding to the "DPi" is full. Whenever the software requests a memory allocation, the memory management system uses the "DPi" having the smallest number of descriptors available, which indicates that the corresponding memory chunk pool is the most full. As a result, the memory blocks with the least number of available memory blocks are filled up first, thereby maximizes data packing.

FIG. 6 illustrates the distribution of allocated memory chunks in a protocol-aware allocation according to an alternative embodiment of the memory management system. In memory 600, memory blocks 602-604 are assigned based on the class or service associated with the data packets or PDUs. PDUs associated with a first service are stored in chunks of memory chunk pool 605 on memory block 602, and PDUs associated with a second service are stored in chunks of memory chunk pool 606 on memory block 603. For example, PDUs associated with a VoIP service are stored to memory block 602, and PDUs associated with web browsing are stored to memory block 603.

The size of the chunks in the different memory blocks may be selected based upon the associated services to ensure that the memory block utilization is optimized. By optimizing the chunks based upon a particular service, there will be less fragmentation in the memory. As data is processed and chunks become available for additional storage, the new PDUs that arrive are likely to be of the same size since they correspond to the same service or class, thereby allowing for one-to-one replacement of the chunks. In the protocol-aware embodiment of FIG. 6, if a particular service is not currently in use, then the associated memory block would not be used and could be powered-off. Alternatively, if a memory block is filled with PDUs, then unassigned memory block 604 can be used for overflow PDU storage.

A protocol-aware memory management system may maintain separate descriptor/chunk pools depending on available QoS levels. The examples in FIGS. 7 and 8 describe an approach specific to an LTE protocol stack; however, the same approach can be used for any other protocol stack providing loss recovery and in-sequence reception functionality.

Using the following notation:
n: total number of memory blocks,
s: memory block size
c: size of memory chunk
m: requested packet size The total number of required memory chunks k=ceil(m/c), where the function "ceil" is finding the minimum integer which is larger than the input value (e.g. ceil(3.7)=4 or ceil (4.1)=5). The number of chunks per block: s/c. The number of occupied chunks in block "i" that are not full: f_i.

In one embodiment, the algorithm for assigning incoming data packets is:
1. Sort the different QoS traffic types based on the incoming packet size. The PDCP SDU size may be used for LTE. Each packet size is associated with a different memory block. The packets associated with a particular QoS type are typically associated with same mode of operation—UM or AM. The mode of operation determines whether retransmissions are allowed, and consequently influences the time required to buffer a particular packet.
2. For every incoming packet, sort the occupied-but-not-full chunks ("f_i") in descending order. Let the largest occupied, but not full chunk be f_j. Assign the incoming packet to f_j.
3. When a particular packet can be deleted (depending on the mode), adjust the f_i value corresponding to the block i.
4. Perform the process for each QoS type.

FIG. 7 is a flowchart illustrating a process for deleting data packets according to one embodiment of the memory management system. In step 701, the memory management system defines the traffic type and QoS for data packets being processed. In step 702, the memory management system receives notification from the system that the data packet is to be deleted. In step 703, the memory chunk "f_i" corresponding to the packet is freed. The memory chunk f_i may be freed by indicating that the corresponding descriptor is available for assignment to a new data packet. In step 704, the memory management system determines if more packets are ready for deletion. If more packets are to be deleted, then the process returns to step 701. Otherwise, if no more packets are ready for deletion, then the process stops at 705.

FIG. 8 is a flowchart illustrating a process for inserting data packets according to one embodiment of the memory management system. In step 801, the memory management system defines the traffic type and QoS for data packets being processed. In step 802, an incoming data packet/SDU is received. In step 803, the memory management system determines the f_j chunk (i.e. the largest occupied, but not full value f_i). The incoming data packet/SDU is assigned to chunk f_j. In step 804, the memory management determines if more incoming data packets are being received. If more packets/SDUs are received, then the process returns to step 801 and the next SDU is assigned to the chunk with the "f_j" value. Otherwise, if no more packets/SDUs are incoming, then the process stops at 805.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A memory module, comprising a first RAM block and a second RAM block, the first RAM block having a first plurality of memory chunks of a first size defined by a first protocol and the second RAM block having a second plurality of memory chunks of a second size defined by a second protocol, the second size different from the first size, and wherein the memory module is further configured to assign a first data packet following the first protocol to the first RAM block and to assign a second data packet following the second protocol to the second RAM block and wherein a given one of the RAM blocks configured to store a descriptor pool having a plurality of descriptors, each of the plurality of descriptors in the descriptor pool uniquely associated with corresponding one of the plurality of memory chunks, the RAM blocks adapted to independently operate in a plurality of modes including an active mode and a power-off mode, the memory module adapted to prioritize assignment of data packets to memory chunks on a RAM block having the most memory chunks already in use and to place unused RAM blocks in the power-off mode.

2. The memory module of claim 1, wherein the plurality of modes further includes a retention mode.

3. The memory module of claim 1, wherein each of the RAM blocks has a same size.

4. The memory module of claim 1, wherein each of the memory chunks has a same size.

5. The memory module of claim 1, wherein the memory module is further configured to assign a data packet to a RAM block selected based upon the data packet's quality of service (QoS).

6. The memory module of claim 1 wherein the memory module is further configured to assign a data packet to a RAM block selected based upon a length of time the data packet is expected to be stored.

7. The memory module of claim 1 wherein the first protocol is a Voice-over-IP (VoiP) protocol, and wherein the second protocol is a web browsing protocol.

8. A method for storing data packets, comprising:
receiving a data packet at a memory module, the memory module comprising a descriptor memory block configured to store a descriptor pool having a list of descriptors and plurality of data memory blocks, each of the plurality of data memory blocks divided into a plurality of memory chunks;
identifying a selected one of the plurality of data memory blocks on which to store the data packet, the selected data memory block identified by determining which of the plurality of data memory blocks has the least available memory space;
storing the data packet to an available one of the plurality of memory chunks on the selected memory block;

linking a selected descriptor in the list of descriptors to the available memory chunk; and placing at least one of the plurality of memory blocks without an occupied memory chunk in a power-off mode, wherein the plurality of data memory blocks further includes a first data memory block and a second data memory block, the first data memory block having a first plurality of memory chunks of a first size defined by a first protocol and the second data memory block having a second plurality of memory chunks of a second size defined by a second protocol, wherein the second size different from the first size, and wherein identifying the selected one of the plurality of data memory blocks on which to store the data packet further comprises:

identifying a protocol associated with the data packet as being the first or second protocol; and identifying the first data memory block as the selected data memory block in response to the identifying protocol being the first protocol and identifying the second data memory block as the selected data memory block in response to the identified protocol being the second protocol.

9. The method of claim 8, wherein identifying the selected one of the plurality of data memory blocks on which to store the data packet further comprises:

identifying a quality of service associated with the data packet; and identifying a data memory block assigned to that quality of service.

10. The method of claim 8, further comprising:

grouping individual ones of the descriptors into descriptor groups, each of the descriptor groups associated with a particular data memory block; and identifying the selected data memory block on which to store the data packet by determining which descriptor group has the least available descriptors.

11. The method of claim 8, further comprising:

when a stored data packet has been processed, returning the descriptor associated with the chunk in which the processed data packet has been stored to an available status.

12. The method of claim 8, further comprising:

determining that the data packet is larger than an available memory chunk;

linking together two or more memory chunks to form a larger virtual memory chunk by linking descriptors associated with the memory chunks; and storing the data packet in the memory chunks forming the virtual memory chunk.

13. An electronic device, comprising:

a memory module configured to store data packets transmitted or received over a network, the memory module having a plurality of memory blocks, the plurality of memory blocks including a first memory block and a second memory block, the first memory block having a first plurality of memory chunks of a first size determined by a first communication protocol and the second memory block having a second plurality of memory chunks of a second size determined by a second communication protocol, the second communication protocol different from the first communication protocol and the second size different from the first size, the memory module configured to assign a data packet to one of the first plurality of memory chunks in response to the data packet following the first communication protocol and to assign the data packet to one of the second plurality of memory chunks in response to the data packet following the second communication protocol.

14. The electronic device of claim 13, wherein the first size is larger than the second size, and wherein at least one of:

(a) the first communication protocol allows packet retransmissions and the second communication protocol does not allow packet retransmissions;

(b) the first communication protocol has a first Quality-of-Service (QoS) higher than a second QoS of the second communication protocol; or (c) the first communication protocol requires that data packets be stored for a longer period of time than the second communication protocol.

15. The electronic device of claim 13, wherein the first and second memory blocks are each configured to operate in any given one of a plurality of power modes, and wherein the memory module is further configured to place the first memory block in a low-power mode in response to there being no stored data packets following the first communication protocol in the first memory block and to place the second memory block in the low-power mode in response to there being no stored data packets following the second communication protocol in the second memory block.

16. The electronic device of claim 15, wherein while the device performs an acknowledgement operation, the memory module is further configured place the first memory block in the low-power mode upon the electronic device having received an acknowledgement packet in response to a data packet transmitted by the device and buffered in the first memory block.

17. The electronic device of claim 15, wherein while the device performs an in-sequence delivery operation, the memory module is further configured place the first memory block in the low-power mode upon the electronic device having received and processed a sequence of data packets buffered in the first memory block.

* * * * *